Sept. 19, 1961 O. W. HOSKING 3,000,390
FLUID VALVE
Filed March 14, 1958
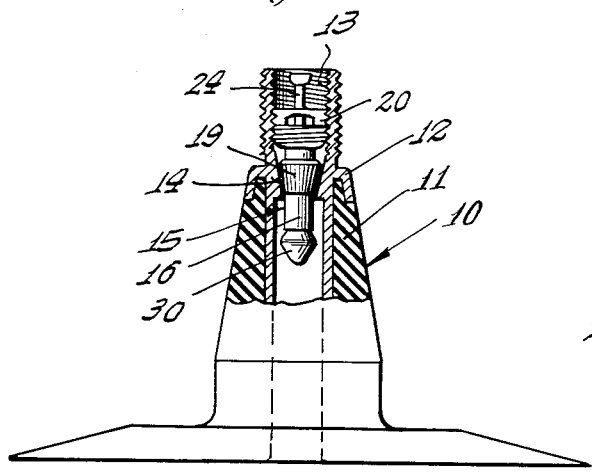
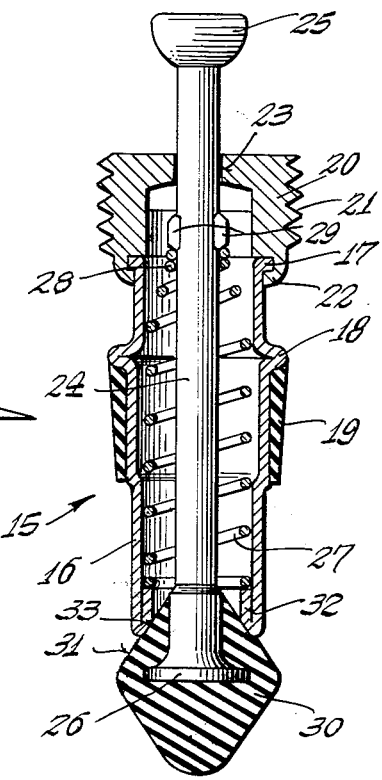
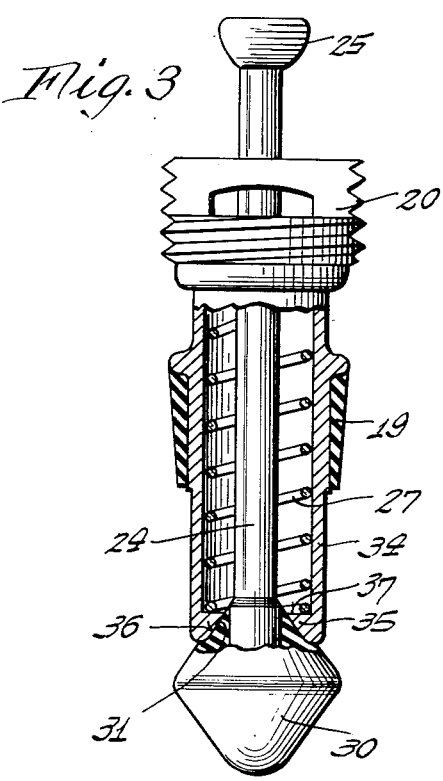
INVENTOR.
Oakley W. Hosking
BY
Johnson and Kline
ATTORNEYS

United States Patent Office 3,000,390
Patented Sept. 19, 1961

3,000,390
FLUID VALVE
Oakley W. Hosking, P.O. Box 416, Monroe, N.Y.
Filed Mar. 14, 1958, Ser. No. 721,377
1 Claim. (Cl. 137—234.5)

The present invention relates to a valve for controlling the flow of fluid from and to a container and more particularly to a valve which is removably securable in a valve stem, such as a tire valve stem, to control the passage of fluid therein.

As presently constructed and commercially available, a valve of the above type which is adapted to be removably secured in a valve stem includes a screw plug having threads which mate with threads formed on the interior of the valve stem. Depending from the screw plug and rotatably attached thereto is a hollow, substantially cylindrical barrel portion. Extending axially through the plug and the barrel portion is a stem to which is attached at the end portion thereof which extends beyond the end of the barrel the members constituting the valving portions of the valve. In present commercially available valves, this valving portion consists of a rubber or other resilient washer contained within a cup with the washer and cup being held on the stem by heading over the end of the valve stem and by forming a flange on the stem adjacent the washer. A spring encircles the stem within the barrel and plug and biases the washer, cup, etc. upwardly against the end of the barrel to form a seal between the end surface of the barrel and the washer. It will be appreciated that this valve construction requires a number of pieces, i.e. the washer and the cup in addition to the plurality of steps required to assemble the pieces and the flanging and heading over of the stem thereby rendering the cost of such a valve relatively expensive for the functions which it performs.

It is an object of the present invention to provide a valve of the above type in which the sealing surfaces are of simpler construction and in which the valve is more economical to manufacture without decreasing the accepted capabilities of the valve.

Another object of the present invention is to provide a valve of the type, which may be removably secured in a valve stem, which requires fewer parts and fewer manufacturing and assembly operations than presently required.

In carrying out the present invention there is provided, as in the prior described commercially available valve, a screw plug having a threaded exterior surface for cooperation with the threaded interior portion of a valve stem. Also there is provided a hollow, substantially cylindrical barrel which is secured to the plug for relative rotation therebetween. There is also provided a stem extending through and beyond the plug and barrel and a spring which tends to bias the end of the stem located beyond the end of the barrel upwardly into the barrel. However, according to the present invention, rather than providing on the end of the stem projecting beyond the end of the barrel a washer and a cup to contain the washer plus forming a flange on the stem adjacent the washer, the present invention provides for heading over the end of the stem and securing to this end a valve stopper of resilient material, such as rubber. This valve stopper, according to the present invention, is molded directly onto the stem and thus requires no additional fastening operations.

To form the sealing surface for the stopper, according to one species of the present invention, the end of the barrel is drawn or otherwise bent inwardly upon itself to form an inwardly converging frusto-conical surface, the stopper having a mating frusto-conical surface. In this embodiment, the barrel is formed by deforming a flat piece of material by a series of drawing operations, similar to eyelet manufacturing techniques.

According to another species of the invention, wherein the barrel is formed as a screw machine part by cutting away material from relatively thick-wall metallic tubing or solid rod, the inwardly converging sealing surface is formed on an integral inwardly projecting flange located at the lower edge portion of the barrel. In both embodiments of the invention, however, the inwardly directed portion of the barrel whose surface forms the sealing surface is used as an abutment which serves as a stop for one end of the spring. Moreover, in both embodiments, the end portion of the barrel is substantially cylindrical and the sealing surfaces are located within the barrel to be protected thereby.

Other features and advantages will hereinafter appear.

In the drawing:

FIGURE 1 is a view of the valve of the present invention shown mounted in a valve stem, the latter being shown partly in section.

FIG. 2 is a sectional view of the valve, somewhat enlarged, according to one species of the present invention.

FIG. 3 is a section of a valve, somewhat enlarged, according to another species of the present invention.

Referring to the drawing, there is shown in FIG. 1 a tire valve stem generally indicated by the reference numeral 10 composed of an exterior rubber or rubber-like portion 11 and bonded thereto is a rigid insert 12 having an inner threaded portion 13. Formed below the threaded portion 13 is a converging surface 14 which mates with a selected portion of a valve, the latter generally referred to as 15 to form a seal between the stem and the valve in a manner which will be hereinafter apparent. While a specific type of stem has been shown, it will be appreciated that applicant's invention is applicable to any stem having threaded and converging portions which cooperate with the valve to enable the valve to be removably secured in and to form a seal with the stem. Particular instances of such stems are those used on inner tubes of automobiles and those attached to rims of tubeless tires.

Referring to FIG. 2, there is shown a section of the valve 15, somewhat enlarged. The valve 15 includes a substantially cylindrical metallic barrel 16 having a flanged end 17 and an intermediate flange 18. Secured, as by molding to the intermediate portion of the barrel, is a ring gasket 19 of rubber or rubber-like material which cooperates with the surface 14 of the stem to provide the seal between the stem and the exterior of the valve. Attached to the flanged end 17 is a screw plug 20 having a threaded exterior portion 21 and a bent-over end 22. This screw plug is of the well-known type having cutouts to provide fluid passage and to enable it to be grasped by a slotted tool to permit rotation of the screw plug. The attachment between the end 22 and the flanged end 17 secures the two parts against axial movement and yet enables relative rotation therebetween in order to prevent rotation between the gasket 19 and the surface 14 which may affect the seal.

Axially mounted within the barrel and plug and extending through an aperture 23 in the plug is a stem 24 having a headed plug end 25 and a headed valve end 26 with the ends 25 and 26 projecting beyond the plug and barrel. Circumscribing the stem within the barrel is a spring 27 having a reduced upper end 28 which abuts flanges 29 formed intermediate the ends of the stem. The spring 27 normally biases the headed valve end 26 of the stem upwardly into the barrel.

According to the present invention, rather than having a plurality of parts attached to the valve end of the stem, the present invention provides for a stopper 30 of rubber or rubber-like material to be molded onto the headed end 26. The stem in the specific embodiment is formed of brass and hence the rubber stopper will adhere thereto while the headed end 26 increases the securement. The upper surfaces 31 of the stopper are frustro-conical, as shown, with the surfaces being converged inwardly toward the barrel.

Cooperating with the surfaces 31 of the stopper 30 to form the seal of the valve is a reversely bent, inwardly directed end portion 32 of the barrel. The outside surface 33 of the portion 32 is frustro-conical to mate with the surface 31 to thereby form an effective fluid-tight seal. Besides being used to form the sealing surface 33, the end portion 32 additionally is utilized to provide a stop on its reverse side for the spring 27.

Shown in FIG. 3 is another species of the valve of the present invention which differs from the species in FIG. 2 only in the barrel in that the barrel of this species, rather than being mechanically formed into shape as is the barrel in FIG. 2, is formed as a screw machine part. Thus this barrel 34 is formed from a length of thick-wall tubing or solid rod by cutting away portions to create the shape shown which is substantially identical to the shape of the barrel in FIG. 2. However, rather than having a reversely bent portion 32, the barrel 34 of the species of FIG. 3 has an inwardly projecting flange 35 which provides on its exterior an inwardly directed frustro-conical surface 36 which mates with the surface 31 of the stopper 30. In addition the inner surface 36 of the flange 35 constitutes a ledge 37 which serves as an abutment for the end of the spring 27. While the present invention may utilize a screw machine barrel, it is preferred to use the drawn barrel shown in FIG. 2 because of the economies effected by the savings in material, labor and overhead.

It will be noted that in both species of the invention, the valve end portion of the barrel has a substantially circular exterior surface and that the surfaces 32 and 36 are located axially within the barrel, whereby the surfaces are protected against damage. Moreover it will be observed that the upper portion of the headed end 26 of the stem is not covered by the stopper 30 and that the maximum diameter of the end 26 is larger than the orifice or minimum internal diameter of the barrel defined by the portion 32 to increase the seal by compression of the stopper 30 against the surface 33 and also to prevent the pulling of the stopper off the stem.

It will thus be appreciated that there has been disclosed a valve which is of simple yet effective construction, requiring very few parts and in which the parts may be economically manufactured. In addition, the valve of the present invention is capable of being quickly and economically assembled to form the completed valve. The valve of the present invention even though being relatively inexpensive to manufacture has been found to be capable of maintaining in effective seal during prolonged operation.

Variations and modifications may be made within the scope of the claim and portions of the improvements may be used without others.

I claim:

A fluid valve adapted to be removably secured in a valve stem comprising a hollow, substantially cylindrical, metallic barrel, a screw plug member secured to one end of said barrel for relative rotation therebetween and having a threaded exterior portion, a stem extending axially through the barrel and plug and therebeyond, a valve stopper of resilient material secured onto the stem, the other end portion of the barrel being of double thickness by the end being turned inwardly upon itself against the inner surface of the barrel and an inwardly directed, converging surface constituting a sealing seat formed adjacent the bend, said valve stopper having a surface mating with the sealing seat to form the seal, the diameter of the inner surface of the double thickness portion of the barrel being substantially greater than the thickness of the stem proximate therewith, and a spring encircling the stem within the barrel and plug and abutting at one end flanges on the stem and at the other end abutting the end of the reversely turned end portion of the barrel forming the sealing seat to maintain the stopper in sealing engagement with the sealing seat.

References Cited in the file of this patent

UNITED STATES PATENTS

| | | |
|---|---|---|
| 1,726,243 | Scott | Aug. 27, 1929 |
| 2,103,108 | Broecker | Dec. 21, 1937 |
| 2,284,971 | Broecker | June 2, 1942 |
| 2,361,890 | Watson | Oct. 31, 1944 |
| 2,451,276 | Crowley | Oct. 12, 1948 |
| 2,625,170 | Mayer | Jan. 13, 1953 |
| 2,667,993 | Ayres | Feb. 2, 1954 |